US006941409B2

(12) United States Patent
Puupponen et al.

(10) Patent No.: US 6,941,409 B2
(45) Date of Patent: Sep. 6, 2005

(54) SWITCHING AND CONNECTING ARRANGEMENT FOR COUPLING EXTERNAL AND INTERNAL ANTENNAS WITH AN EXPANSION CARD

(75) Inventors: Marko Puupponen, Tampere (FI); Ari Väisänen, Ruutana (FI); Jarmo Verho, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 443 days.

(21) Appl. No.: 09/894,184

(22) Filed: Jun. 28, 2001

(65) Prior Publication Data

US 2004/0225786 A1 Nov. 11, 2004

(30) Foreign Application Priority Data

Jun. 30, 2000 (FI) .............................. 20001558

(51) Int. Cl.$^7$ ........................ G06F 13/00; G06F 13/38
(52) U.S. Cl. ........................ 710/316; 710/240; 710/38; 455/73; 455/78; 343/700
(58) Field of Search ................... 710/305–317, 710/240–242, 36–38, 62–64, 300–304, 72, 355–356; 455/73, 78, 82–84, 575, 545; 343/700; 333/101, 103, 104

(56) References Cited

U.S. PATENT DOCUMENTS

| | | | | |
|---|---|---|---|---|
| 5,412,393 A | * | 5/1995 | Wiggenhorn | ................ 343/702 |
| 5,453,019 A | * | 9/1995 | Garver et al. | ................ 439/188 |
| 5,574,987 A | * | 11/1996 | Wallace | ........................ 455/82 |
| 5,628,055 A | | 5/1997 | Stein | ............................ 455/89 |
| 5,722,089 A | * | 2/1998 | Murakami | ................... 455/575 |
| 5,768,691 A | * | 6/1998 | Matero et al. | ................. 455/78 |
| 5,809,115 A | | 9/1998 | Inkinen | .................... 379/93.05 |
| 5,966,097 A | | 10/1999 | Fukasawa et al. | ... 343/700 MS |
| 6,115,585 A | * | 9/2000 | Matero et al. | ................. 455/78 |
| 6,140,970 A | * | 10/2000 | Ylijurva | ..................... 343/702 |
| 6,142,804 A | * | 11/2000 | Peloza et al. | ............... 439/188 |
| 6,256,495 B1 | * | 7/2001 | Francisco et al. | .......... 455/426 |
| 6,304,222 B1 | * | 10/2001 | Smith et al. | ................ 343/702 |
| 6,411,831 B1 | * | 6/2002 | Oshimi et al. | .............. 455/575 |
| 6,518,855 B1 | * | 2/2003 | Gerlach et al. | ............. 333/103 |
| 6,535,748 B1 | * | 3/2003 | Vuorio et al. | ............... 455/552 |
| 6,574,461 B1 | * | 6/2003 | Skold | ....................... 455/277.2 |
| 6,587,698 B1 | * | 7/2003 | Dosch | ........................ 455/558 |
| 6,768,460 B2 | * | 7/2004 | Hoashi et al. | ....... 343/700 MS |

FOREIGN PATENT DOCUMENTS

| | | |
|---|---|---|
| DE | 3522564 A1 | 1/1986 |
| FI | 102927 B | 3/1999 |
| WO | WO 00/18026 | 3/2000 |

* cited by examiner

Primary Examiner—Paul R. Myers
Assistant Examiner—Raymond N Phan
(74) Attorney, Agent, or Firm—Perman & Green, LLP

(57) ABSTRACT

A switching and connecting arrangement for coupling external and internal antennas, wherein the arrangement comprises at least a diversity switch arranged on a circuit board for selecting a first antenna or a second antenna. The arrangement also comprises a first integrated antenna switch arranged on said circuit board for selecting a first antenna and connecting it electrically to said diversity switch, wherein the first antenna switch is forced mechanically to select the first external antenna instead of the first internal antenna when it is coupled to said switch, and to select the first internal antenna when disconnected; a second integrated antenna switch arranged on said circuit board for selecting a second antenna and connecting it electrically to said diversity switch, wherein the second antenna switch is forced mechanically to select the second external antenna instead of the second internal antenna when it is coupled to said switch, and to select the second internal antenna when disconnected.

10 Claims, 3 Drawing Sheets

SWITCHING AND CONNECTING ARRANGEMENT FOR COUPLING EXTERNAL AND INTERNAL ANTENNAS WITH AN EXPANSION CARD

BACKGROUND OF THE INVENTION

1. Field of the Invention

The present invention relates to a switching and connecting arrangement for coupling external and internal The invention also relates to an expansion card and a switching and connecting arrangement for it.

2. Description of Related Art

According to prior art, various electronic devices, such as portable personal computers (PC) are often provided with an expansion card connection, to which a standard expansion card can be connected. The expansion card may contain the radio parts of a wireless communication device with its internal antenna, wherein the PC may use this communication unit, or card-like wireless communication device, to communicate with a data transmission network. The expansion card can also constitute a network adapter, for example for a wireless local area network (WLAN). Said antennas are used for transmitting and receiving radio-frequency signals, and the signals are transferred between the radio part and the antenna by means of wires and connectors.

One known expansion card is a PC card complying with the PCMCIA standard (Personal Computer Memory Card International Association). Other known expansion cards include e.g. a so-called CompactFlash (CF) card according to the CFA standard (Compact Flash Association). For example for these CF cards, there are also adapters of the size of a PCMCIA card, in which the CF card is inserted for a PCMCIA connection.

A WLAN network adapter communicates directly with other devices or a local area network e.g. via an access point (AP). In a local area network of devices and a network adapter, arranged for example for a short-range data transmission connection (low power radio frequency, LPRF; short range radio frequency, SDRF), the frequency available is for example approximately 2.4 GHz, that is, 2400 MHz. An AP unit is typically used in public rooms and offices, wherein it is placed for example on a wall and an omnidirectional antenna is coupled to it. The network adapter can also be placed in an aircraft wireless LAN unit (AWLU) which is intended for fast wireless connection to the network of an aircraft during taxying and airport operations. In a home environment, the network adapter is located in an asymmetric digital subscriber line (ADSL) terminal which can be further used to set up e.g. a fast data transmission connection via a telephone network to the Internet network. A connection to the Internet network can also be set up by so-called portable web tablet devices which comprise a browser and communicate in a wireless manner with the terminal, e.g. a PC device, which is further connected to a LAN network or a telephone network. The terminal comprises a network adapter in a corresponding manner.

The requirements for operation of the above-described devices vary, wherein e.g. the properties and coverage areas of antennas vary and the environment affecting the operation of the antenna changes. Internal antennas on the circuit board of the card are, in some cases, placed wholly inside the terminals, which interferes with the reception and transmission of antenna signals. Thus, there is a need to use external antennas. In a network adapter installed in a stationary location, it is possible to use external antennas. These would be difficult to use if the expansion card is coupled e.g. to a portable device, wherein an internal antenna is better. If necessary, two antennas must be used, e.g. two internal antennas, to utilize the diversity.

For using various antennas, a variety of versions must be made of the expansion card, particularly of the circuit board to be placed in it, for different needs. It is difficult to arrange the manufacture and to estimate the need for different versions. External antennas are slightly used, wherein it is also expensive to arrange manufacture for a small need. The user will need several different expansion cards, if different antennas are required by varying use conditions, for example to secure a sufficiently long distance of transmission or reliable data transmission.

One known expansion card and its use is described in more detail e.g. in U.S. Pat. No. 5,809,115. An external antenna can be coupled to the expansion card by means of a connector. An expansion card is also known which is provided with a housing for an antenna at its end, wherein the antenna housing extends outside a PC device. The expansion card is at least partly placed inside the expansion card connection of the device. Another expansion card is disclosed in publication U.S. Pat. No. 5,628,055, wherein external antennas can be coupled to the end of a card, placed outside the card. U.S. Pat. No. 5,966,097 presents an expansion card comprising two L-shaped interted-F antennas (IFA) fitted on top of a circuit board used as a ground plane. Diversity is utilized by always coupling the antenna which is best suited for reception. The coupling is implemented with an antenna switch. To the antenna switch are connected the feed lines of both antennas and a line whereby the signals received by the antennas are fed to a transceiver.

BRIEF SUMMARY OF THE INVENTION

It is an aim of the present invention to eliminate the above-mentioned drawbacks and to present an antenna switching and connecting arrangement placed on a circuit board, whereby also external antennas can be coupled to e.g. an expansion card comprising an internal antenna. A particular advantage is achieved by utilizing the diversity, wherein the switching arrangement can be used to have different combinations of two internal and two external antennas by using two antenna switches. Thanks to the invention, there is no need to manufacture different versions of the expansion card or its circuit board for different uses and antenna assemblies. By means of an integrated mechanical antenna switch, the correct antenna is automatically switched for use.

According to an advantageous embodiment of the invention, a diversity switch and an RF switch are integrated in the same component, wherein, in addition to saving space, attenuation of even 0.5 to 1 dB smaller and a simpler assembly are achieved than with separate components. The switches are integrated in an integrated circuit or a common housing.

A central principle of the invention is the use of an integrated mechanical RF antenna switch in the coupling of antennas. A central principle of the invention is also to set up one circuit board version with its components and couplings to cover the different switching and antenna alternatives. If several network adapters are located within the service area of each other, their antennas can now be easily changed to achieve better network capacity and a lower noise level. For example, omnidirectional antennas can be changed to more directional antennas, or vice versa, by using the same expansion card.

BRIEF SUMMARY OF THE DRAWINGS

In the following, the invention will be described in more detail with reference to the appended drawings, in which.

DETAILED DESCRIPTION OF THE INVENTION

Figure 1:
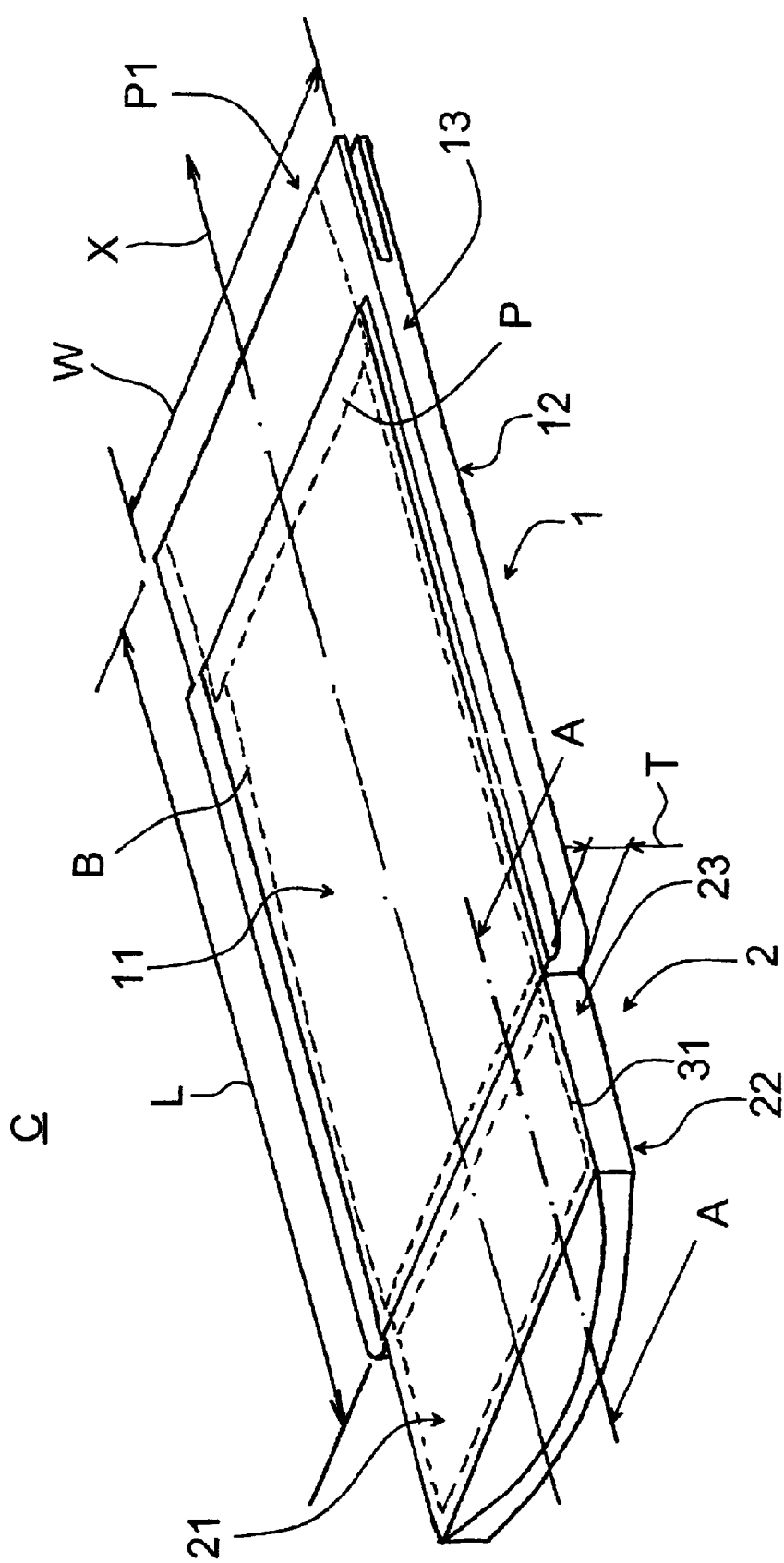
FIG. 1 shows a preferred embodiment of the expansion card according to the invention in a perspective view.

FIG. 1 shows an expansion card C according to prior art, the card part 1 being a PC card complying with the PCMCIA standard. According to the PCMCIA standard, the PC card has a length of 85.6 mm and a width W of 54 mm. PC cards are divided into three types, wherein the thickness T of the PC card can be 3.3 mm (type I), 5.0 mm (type II) or 10.5 mm (type III). The PC cards are designed to be fully inserted inside a PC by a movement in the direction of the longitudinal axis X of the PC card, but so-called extended PC cards can be longer than ordinary PC cards. The PC card is equipped with a 68-pin connector P complying with the PCMCIA standard, by means of which the PC card is connected to e.g. a PC. The contact holes P1 of the connector P are fitted at the end of the PC card on the outer surface edging the PC card. A known CF card has a length of 42.8 mm, width of 36.4 mm and thickness of 3.3 mm (type I) or 5 mm (type II), and the card is equipped with a 50-pin connector complying with the CFA standard.

With reference to FIG. 1, the connector P is normally fixed to a circuit board (not shown in the figure) which is placed inside the card C and which also comprises the components required for the operations of the PC card functions (for example integrated circuit, IC) and the wirings for transferring electrical signals between the connectors and the components. The components (not shown in the figure) comprise a transducer for processing signals which are transmitted and received at radio frequency in a wireless manner by means of the antenna. The card C, normally a circuit board, is also provided with the necessary wirings and electrical circuits for transferring signals between the transceiver and the electronic device. The antenna is normally coupled to the transceiver also by means of an electrical matching circuit which can be used to tune the operation of the antenna further. The operation of the transceiver, said electrical circuits and the transmission of signals to the electronic device are known as such to anyone skilled in the art, wherein their more detailed description will be unnecessary.

FIG. 1 illustrates the placing of the connector, partly left inside the card C, with a broken line P, the placing of the circuit board left fully inside the card C with a broken line B, and the placing of the circuit board part left fully inside the expansion part 2 of the card C, with a broken line 31. The parts B and 31 normally constitute one integrated circuit board. The expansion part 2 also contains the internal antenna of the card which is e.g. an IFA antenna, a microstrip antenna placed on a circuit board, or an IFA antenna comprising a passive and an active antenna element. The lengths of the elements are about ¼ of the wavelength used, and they are placed apart from each other on the circuit board. The operation of the antennas is known as such, and when diversity is used, two antennas are placed in the expansion card.

The card part 1 normally comprises a cover structure 11 and a bottom structure 12. The card part 1 can also comprise a frame structure 13 which at least partly constitutes the outer surface edging the card C and to which the cover and bottom structures 11 and 12 are attached. The expansion card 2 can also be arranged as a separate, replaceable part, or as an integrated, inseparable part with the card part 1. The expansion part 2 is preferably placed outside the slot-like, socket-like expansion card connection. The expansion card 2 comprises a cover structure 21 and a bottom structure 22, whose joint thickness preferably corresponds to the maximum thickness T of the card part 1 and whose joint width is preferably smaller than or equal to the width W of the card part. It is obvious that the cover structure 21 and/or the bottom structure 22 can also be attached to each other by means of a separate frame structure 23.

Figure 2:
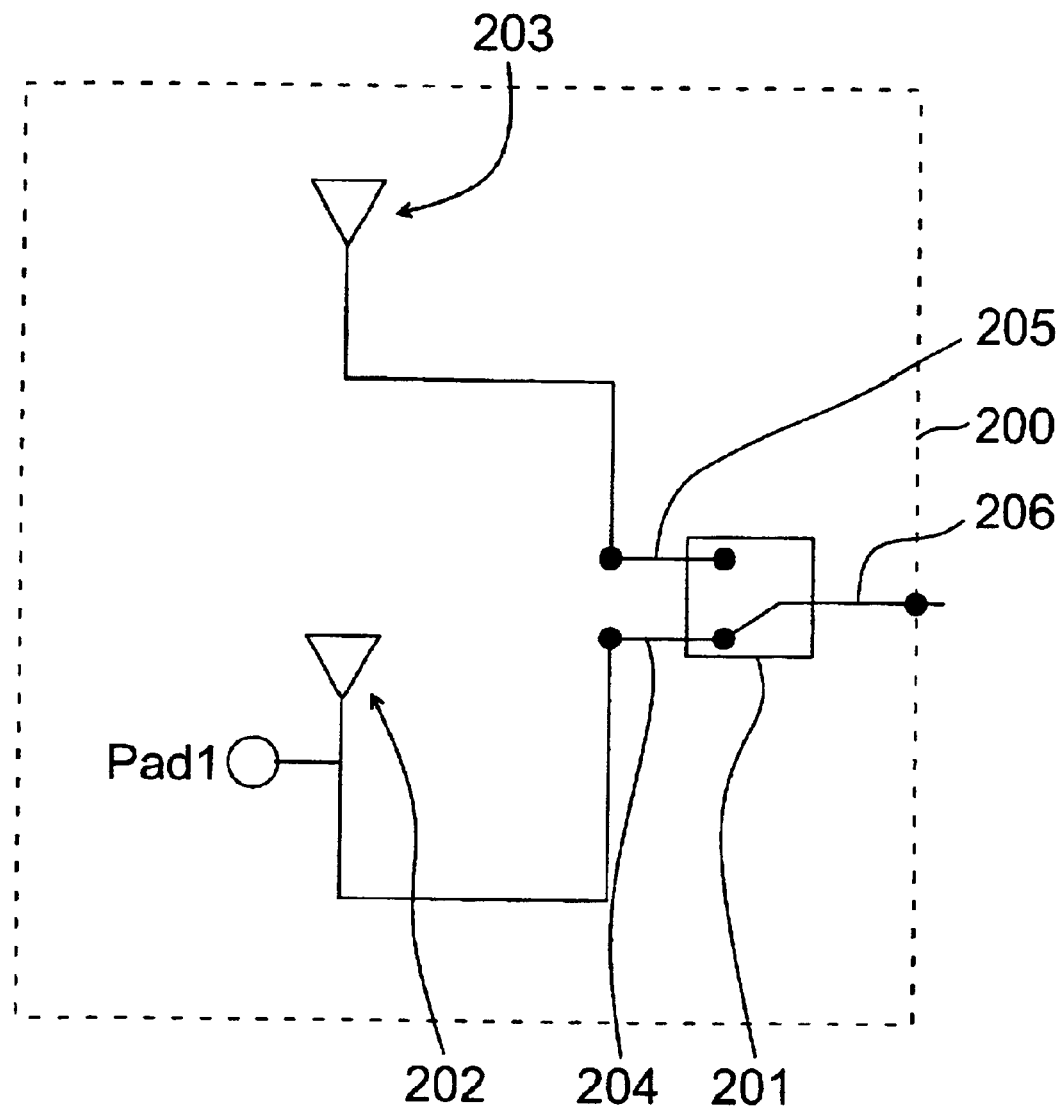
FIG. 2 shows a switching and connecting arrangement according to prior art in a principle view.

FIG. 2 illustrates the case of prior art in a reduced principle, wherein a circuit board 200 to be placed in the expansion part 2 is provided with a diversity switch 201, known as such. It is arranged to select either a first internal antenna 202 or a second internal antenna 203. By means of the switch 201, the feed line of the desired antenna is electrically coupled to the circuit of the transceiver. The switch and its switching operation can be implemented by means of electrical components, and its operation as controlled from the transceiver (baseband processor) in a way known as such.

For the couplings, the diversity switch 201 has at least a feed interface 204, to which the antenna 202 is electrically coupled, at least a feed interface 205, to which the antenna 203 is electrically coupled, and at least a feed interface 206, which is electrically coupled to the circuit of the transceiver for transferring radio frequency (RF) signals. The switch 201 is for example an integrated circuit (IC) fixed on a printed circuit board (CB) 200 and coupled to the strip conductors of the circuit board by means of wirings. The state of the switch 201 is controlled e.g. by means of control voltages. Of the switches, small signal losses and good isolation of conductors used as ports are required.

Figure 3:
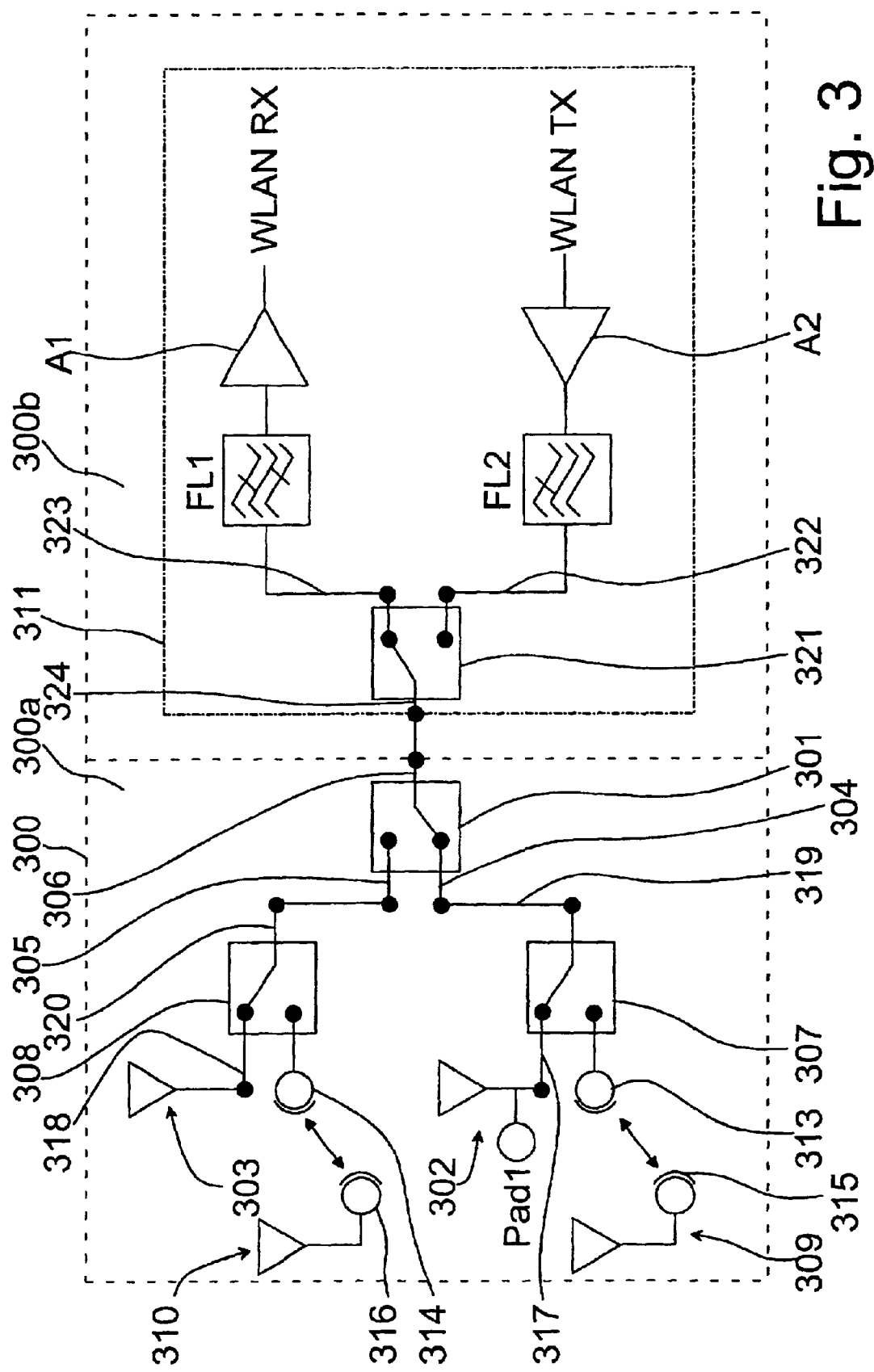
FIG. 3 shows a switching and connecting arrangement according to a preferred embodiment of the invention in a principle view.

FIG. 3 illustrates a preferred embodiment of the invention. The circuit board 300 to be placed in the card C is provided with a diversity switch 301 known as such. A part 300a of the circuit board 300 is primarily placed in the expansion part 2, and a part 300b is primarily based in the card part 1. The switch 301 with its parts functionally correspond to the switch 201 shown in FIG. 2. The switch 301 comprises feed interfaces 304, 305. The internal antennas 302 and 303 correspond to the antennas 202 and 203 of FIG. 2. The internal antennas are preferably placed in the expansion part 2. An antenna switch 307 is now placed between the antenna 302 and the switch 301, arranged to select either the internal antenna 302 or an external antenna 309, if it is coupled to a feed interface 313. By means of the antenna switch 307, the feed line of the antenna 302 or 309 is electrically connected to the diversity switch 301 and further to the electrical circuit 311 of the transceiver.

The antenna switch 307 is a mechanical, integrated RF switch which is mechanically forced to select the external antenna 309 instead of the internal antenna 302 when its interface 315, for example a female or male part of a coaxial connector is inserted to a counterpart in the switch 307 to provide an electrical contact to the feed interface 313. The interfaces 313, 315 are used to transmit the antenna signal and often also the ground potential between the circuit board and the antenna. The external antenna 309 is e.g. a monopole antenna, known as such, which is coupled to the expansion card by means of a coaxial cable. The antenna switch 307 itself has a structure known as such, and it mechanically couples in use an internal antenna 302, when the interface 315 of the antenna 309 is disconnected. The switch 307 thus automatically keeps the diversity switch 301 connected to one antenna, without a separate external mechanical or electrical control and thanks to its internal mechanical operation. In one embodiment, the antenna switch 307 is an encapsulated RF component fixed to the circuit board 300, the interface 313 being directly attached to it. The connector is e.g. of SMA or SMC type. The expansion part of the card has a structure provided with an opening in which the interface 313 is placed.

One known antenna switch 307 is placed in a cut formed at the edge of the circuit board 300 substantially in alignment of the circuit board, wherein the external antennas are connected to it in a parallel movement. The connector is placed on the same plane with the circuit board. The circuit board is provided with a conductive ground contact to which the outer shell of the connector is coupled, a separate first contact area for an RF signal contact, as well as a second contact area through which the RF signal is connected to the internal antenna. A contact spring keeps said areas in contact with each other, wherein the signal is led to the internal antenna or a signal coming from the antenna is led to the rest of the circuit. The central pin of the connector moves into a different position when the external antenna is coupled to the connector, wherein it also lifts the contact spring off the second contact area. At the same time, the central pin itself forms an electrical contact with the spring and thereby further with the first contact area for transferring signals. The contact to the second contact area is thus cut off.

The antenna switch 307 also comprises at least a feed interface 317 to which an antenna 302 is electrically coupled, and at least a interface 319 which is electrically connected to the diversity switch 301 for transferring RF signals. The coupling of the interfaces 317 and 319 and the related wiring structures are permanent structures connected e.g. by soldering.

An antenna switch 308 is now placed between the antenna 303 and the switch 301, arranged to select either the internal antenna 303 or the external antenna 310, if it is coupled to the feed interface 314. The antenna switch 308 is used to connect the feed line of the antenna 303 or 310 electrically to the diversity switch 301 and further to the electrical circuit 311 of the transceiver. In other respects, the operation and structure of the antenna switch 308 correspond to the operation of the antenna switch 307 presented above, when the interface part 316 of the antenna 310 is coupled to its feed interface 314. The antenna 303 is electrically coupled to the feed interface 318, and the interface 320 is in electrical contact with the diversity switch 301 for transferring RF signals.

The diversity switch 301 can be used to select, according to the conditions, either of the two antennas, of which one or both can be external antennas if they are coupled. The selection can be made between antenna pairs 302 and 303; 302 and 310; 309 and 303; as well as 309 and 310. If no external antennas are coupled, only the antenna pair 302 and 303 can be selected. If both of the external antennas are coupled, only the antenna pair 309 and 310 can be selected. If only one external antenna is coupled, the antenna pair 302 and 310 or the antenna pair 309 and 303 can be selected.

The circuit board is also provided with wiring structures for leading signals and other necessary components, such as capacitances, resistances and inductances, for electrical arrangement of the antennas and for arranging the circuit impendances. The circuit board also comprises a conductive ground level. The RF signal can be lead from the transceiver to the separate circuit board by means of an inductive coupling and further to the interface 306 of the diversity switch 301. The circuit board is preferably arranged in such a way that it can also be used to implement the arrangement of FIG. 2 to avoid the manufacture of several different circuit board versions.

The different versions are implemented by replacing some of the fitting capacitors on the circuit board to form new couplings for different versions and for coupling the strip conductors on the circuit board in a different way. With a correct placing of the strip conductors, also attenuation of the RF signal is avoided. It is obvious that in the version of FIG. 2, there is no need to couple antenna switches on the circuit board, wherein the signal is led directly to the internal antenna. FIGS. 2 and 3 also show a conductive connection (Pad1) on the circuit board, used as a measuring point for tuning of components in the manufacture.

FIG. 3 also shows a part of the circuit 311 of the transceiver more closely. It comprises an electrically controlled RF switch 321 by means of which the RF signal is led from the transmitter part TX of the circuit 311 to the diversity switch 301 via a interface 322, and by means of which the RF signal is led from the diversity switch 301 to the receiver part RX of the circuit 311 via a switch 323. The TX branch is provided with a low pass filter FL2 and a transmission amplifier A2, and the RX branch is provided with a band pass filter FL1 and a receiving amplifier A1, their operation being known as such. By placing the filters separately, their properties can be better optimized for either transmission or reception. The transceiver couples the TX branch to the diversity switch 301 when the RF signal is transmitted, and the RX branch when the RF signal is being received, via a feed interface 324. The diversity switch 301 is further used to select the desired antenna e.g. to utilize the diversity or to switch the desired antenna into use.

According to an advantageous embodiment of the invention, the RF switch 321 and the diversity switch 301 are integrated in the same component which is placed on the circuit board 300. Thus, the integrated circuit or encapsulation formed comprises connections corresponding to the connections 304, 305, 322, and 323. The connections 306 and 324 are formed in the component itself. In this case, the TX and RX branches must be coupled to the circuit board 300.

It is obvious that the invention is not limited solely to the above-presented advantageous embodiments of the invention, but it can be modified within the scope of the claims. The arrangement can also be applied in other devices for wireless data transmission, utilizing the diversity of two dual antennas as well as external and internal antennas.

What is claimed is:

1. A switching and connecting arrangement for coupling external and internal antennas, wherein the arrangement comprises at least a first integrated antenna switch arranged on said circuit board for selecting either a first internal antenna or a first external antenna to be coupled and connecting it electrically to a diversity switch, wherein the first integrated antenna switch is forced mechanically to select the first external antenna instead of the first internal antenna when the first external antenna is coupled to said first integrated antenna switch, and to select the first internal antenna when disconnected, and a second integrated antenna switch arranged on said circuit board for selecting either a second internal antenna or a second external antenna to be coupled and connecting it electrically to said diversity switch, wherein the second integrated antenna switch is forced mechanically to select the second external antenna instead of the second internal antenna when the second external antenna is coupled to said second antenna switch, and to select the second internal antenna when disconnected, and wherein said diversity switch is arranged on a circuit board for selecting the first integrated antenna switch or the second integrated antenna switch and for connecting said first and second integrated antenna switches in turns electrically to the circuit of a transceiver.

2. The arrangement according to claim 1, wherein the diversity switch comprises at least a first feed interface arranged for coupling the first integrated antenna switch to the diversity switch, at least a second feed interface arranged for coupling the second integrated antenna switch to the diversity switch, and at least a third interface for coupling said diversity switch to said circuit, wherein the first integrated antenna switch comprises a fourth feed interface arranged for coupling the first internal antenna to the first integrated antenna switch, at least a fifth feed interface arranged for coupling the first external antenna with its interface to the first integrated antenna switch, and at least a sixth interface for coupling the first integrated antenna switch to said diversity switch, and wherein the second integrated antenna switch comprises a seventh feed interface arranged for coupling the second internal antenna to the second integrated antenna switch, at least an eighth feed interface arranged for coupling the second external antenna with its interface to the second integrated antenna switch, and at least a ninth interface for coupling the switch to said diversity switch.

3. The arrangement according to claim 1, wherein the arrangement also comprises a switch arranged for coupling said diversity switch electrically to said circuit, wherein the switch comprises at least a tenth interface arranged for coupling the receiving part of said circuit to the switch, at least an eleventh interface arranged for coupling the transmission part of said circuit to the switch, and wherein said switch is arranged to connect said diversity switch to the receiving part for transferring a signal received with the selected antenna, or to the transmission part for transmitting a signal by means of the selected antenna.

4. The arrangement according to claim 1, wherein the receiving part comprises a separate bandpass filter for processing a received signal, and that the transmission part comprises a separate low pass filter for processing a signal to be transmitted.

5. The arrangement according to claim 1, wherein said circuit board is fitted in an expansion card comprising said transceiver and also an expansion part fitted at the end of the expansion card, wherein said circuit board at least partly and said internal antennas are arranged inside said expansion part.

6. The arrangement according to claim 1, wherein the first internal antenna and the second internal antenna are arranged on said circuit board.

7. The arrangement according to claim 3, wherein said switch and said diversity switch are integrated in a component comprising at least said first feed interface, said second feed interface, said tenth interface, and said eleventh interface.

8. An expansion card comprising a switching and connecting arrangement for coupling external and internal antennas, wherein the arrangement comprises at least a first integrated antenna switch arranged on said circuit board for selecting either a first internal antenna or a first external antenna to be coupled and connecting it electrically to a diversity switch, wherein the first integrated antenna switch is forced mechanically to select the first external antenna instead of the first internal antenna when the first external antenna is coupled to said first integrated antenna switch, and to select the first internal antenna when disconnected, and a second integrated antenna switch arranged on said circuit board for selecting either a second internal antenna or a second external antenna to be coupled and connecting it electrically to said diversity switch, wherein the second integrated antenna switch is forced mechanically to select the second external antenna instead of the second internal antenna when the second external antenna is coupled to said second integrated antenna switch, and to select the second internal antenna when disconnected, and wherein said diversity switch is arranged on a circuit board of the expansion card for selecting the first integrated antenna switch or the second integrated antenna switch and for connecting said first and second antenna switches in turns electrically to the circuit of a transceiver, wherein said expansion card consists of at least a card part arranged to be inserted preferably fully inside the expansion card connection of an electronic device, and an expansion part attached to the end of said card part, said circuit board being fitted at least partly and the first internal antenna and the second internal antenna being fitted inside the expansion card.

9. The expansion card according to claim 8, wherein the diversity switch comprises at least a first feed interface arranged for coupling the first integrated antenna switch to the diversity switch, at least a second feed interface arranged for coupling the second integrated antenna switch to the diversity switch, and at least a third interface for coupling said diversity switch to said circuit, wherein the first integrated antenna switch comprises a fourth feed interface arranged for coupling the first internal antenna to the first integrated antenna switch, at least a fifth feed interface arranged for coupling the first external antenna with its interface to the first integrated antenna switch, and at least a sixth interface for coupling the first integrated antenna switch to said diversity switch, and wherein the second integrated antenna switch comprises a seventh feed interface arranged for coupling the second internal antenna to the second integrated antenna switch, at least an eighth feed interface arranged for coupling the second external antenna with its interface to the second integrated antenna switch, and at least a ninth interface for coupling the second integrated antenna switch to said diversity switch.

10. The expansion card according to claim 8, wherein said arrangement also comprises a switch arranged for coupling said diversity switch electrically to said circuit, wherein the switch comprises at least a tenth interface arranged for coupling the receiving part of said circuit to the switch, at least an eleventh interface arranged for coupling the transmission part of said circuit to the switch, and wherein said switch is arranged to connect said diversity switch to the receiving part for transferring a signal received with the selected antenna, or to the transmission part for transmitting a signal by means of the selected antenna.

* * * * *

UNITED STATES PATENT AND TRADEMARK OFFICE
CERTIFICATE OF CORRECTION

PATENT NO. : 6,941,409 B2
DATED : September 6, 2005
INVENTOR(S) : Puupponen et al.

It is certified that error appears in the above-identified patent and that said Letters Patent is hereby corrected as shown below:

Column 6,
Line 52, after "second" insert -- integrated --.

Signed and Sealed this

Tenth Day of January, 2006

JON W. DUDAS
*Director of the United States Patent and Trademark Office*